July 9, 1929.  E. H. REMDE  1,720,237
INDUSTRIAL TRUCK
Filed May 9, 1924  6 Sheets-Sheet 1

Inventor:
Edward H. Remde
By Edward R. Alexander
atty

July 9, 1929.　　　E. H. REMDE　　　1,720,237
INDUSTRIAL TRUCK
Filed May 9, 1924　　　6 Sheets-Sheet 3

INVENTOR.
Edward H. Remde
BY
Edward R. Alexander
ATTORNEY.

July 9, 1929.  E. H. REMDE  1,720,237
INDUSTRIAL TRUCK
Filed May 9, 1924  6 Sheets-Sheet 4

INVENTOR.
Edward H. Remde
BY Edward H. Alexander
ATTORNEY.

Patented July 9, 1929.

1,720,237

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Application filed May 9, 1924. Serial No. 712,059.

This invention relates to an industrial truck, more particularly a truck capable of handling material, including fluids, liquid and granular or lump materials, to dump or pour the material into a receptacle and to remove it therefrom. The invention may be adapted for use in connection with metal founding, where a pot or crucible is to be charged with material to be melted, and the material, when melted, is to be removed or dipped out and conveyed to a distant point and poured into ladles or directly into molds. In practice, the invention has been used for dipping a charge of molten glass and conveying it to and dumping it into a drawtube, but it will be understood that the invention may be applied to the handling materials of different kinds.

One object of the invention is to provide an improved truck of this character having a material holding member and means for operating the member to dump material into a pot or container or remove it therefrom in a rapid and readily controlled manner.

Another object of the invention is to provide a truck of this character capable of removing a charge of material from a pot, crucible or other container of liquid or other material and conveying it in a rapid manner to a distant point, whereby the material may be handled in large quantities and a saving in time and less waste of material results.

Another object of the invention is to construct a truck carrying a fluid holding member and to combine therewith improved mechanism for operating the holding member, whereby it may be rapidly manipulated to dip the material out of a pot or container, to pour or dump it into receptacles, ladles or mold cavities, or hold the fluid while the truck is being driven from place to place.

A further object of the invention is to construct a truck of this character in which the material holding member and operation of the truck are readily controlled.

Other objects of the invention will be apparent to those skilled in the art to which my invention relates from the following description taken in connection with the accompanying drawings, wherein.

In the drawings, 1 indicates a frame supported by pairs of wheels 2, 3. The pairs of wheels are preferably of the same size and either or both pairs may be driven. In the present illustrated form of construction, both pairs of wheels 2, 3, are driven, preferably by separate electric motors 2', 3', operating through suitable power transmitting and axle mechanisms 4, which may be of any desired construction. Each motor 2', 3', and the axle housing therefor may be connected together as a unit and connected with the frame 1 by a suitable suspension mechanism 5. No claim is made herein to the suspension mechanism, since it forms the subject matter of a co-pending application filed jointly by myself and John H. Hertner, Serial No. 420,630. The frame 1 may comprise side and end members 1ª formed from channel bars and intermediate longitudinal members 1ᵇ and transverse members 1ᶜ, suitably connected in a rigid manner. 6, 6, indicate a pair of upright angle members, disposed near the controlling or driving end of the truck and preferably extending above and below the frame 1, and rigidly connected thereto. Above the frame 1, the angle members 6 support a dash 7 on which are mounted controllers 8, 9, 10, each having an operating handle, and a controller 11, connected by suitable gears and links with a lever 12 pivoted on the dash 7. The controller 11 is for the purpose of controlling the circuits to the motors 2', 3'. The purpose of the controllers 8, 9, 10, will be later set forth.

Figure 2:
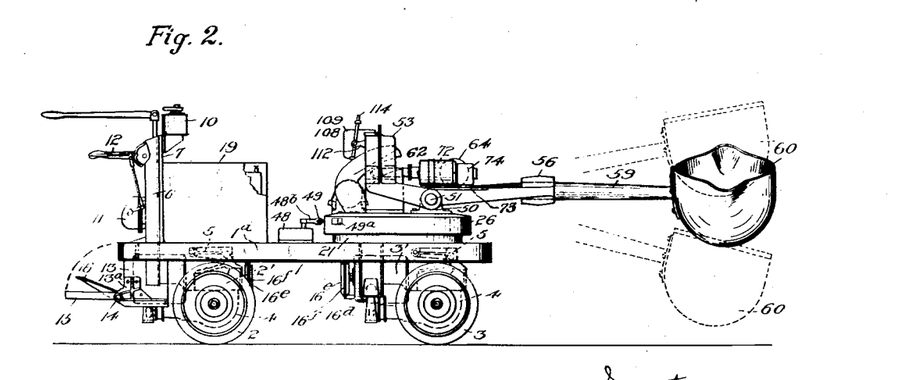
Fig. 2 is a side view of the truck.
Figures 11, 12, 13:
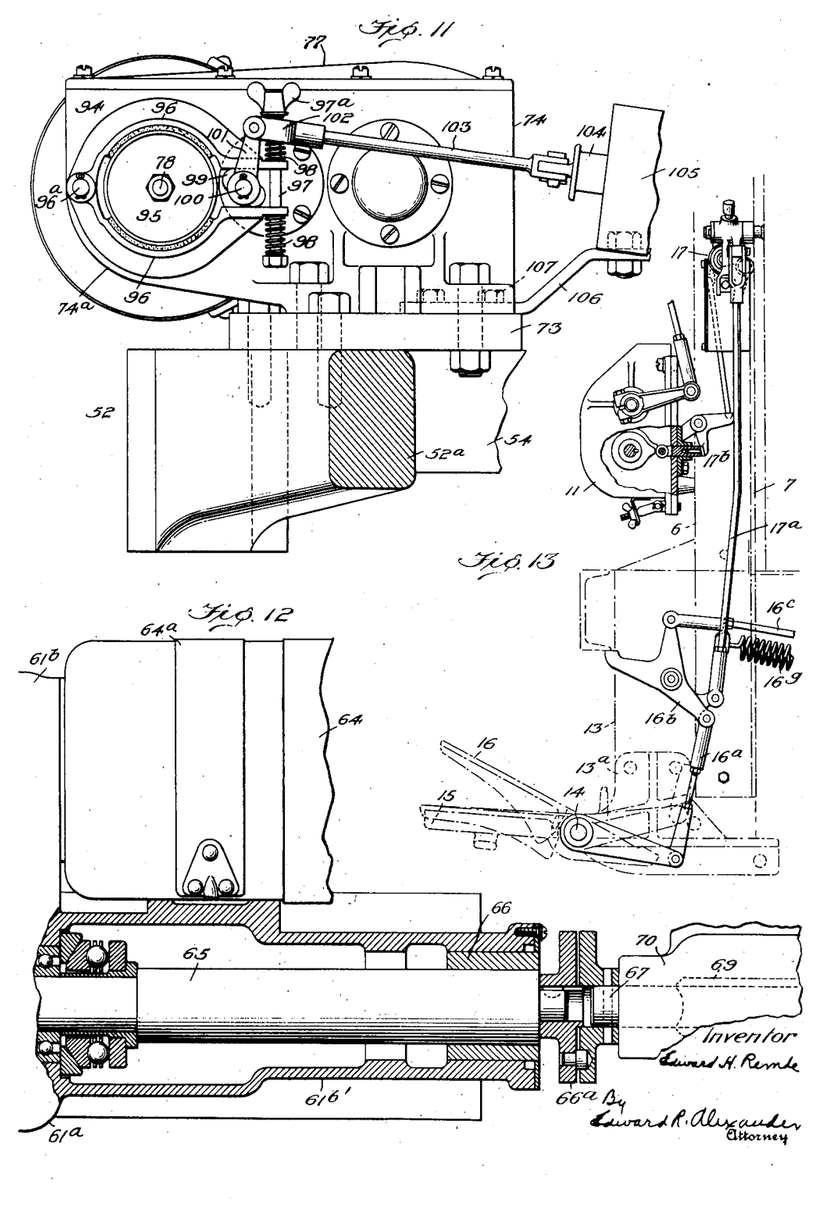
Fig. 11 is a section on the line 11—11 of Fig. 3.
Fig. 12 is a fragmentary view, partly in section, of the motor and mechanism for oscillating the shaft which supports the material holding member.
Fig. 13 is a fragmentary side view of the driving end of the truck, enlarged.

Below the frame 1, the angle members 6 support a pair of plates 13, 13, which in turn respectively support brackets 13$^a$, supporting the opposite ends of a transverse rod or shaft 14. 15 indicates a platform for the operative to stand on while operating the truck and a material holding member, which will later be described. The platform 15 is pivoted on the shaft 14, whereby it can be thrown up (see dotted lines in Fig. 2) when not in use. 16 indicates a foot pedal pivoted on the shaft 14 and free to be moved upwardly about the shaft with the platform 15 when the latter is moved into its inoperative position. The foot pedal 16 is connected through a suitable link 16$^a$, lever 16$^b$ and rod 16$^c$, with a brake mechanism 16$^d$, one element of which preferably comprises a wheel 16$^e$ fixed to an extended end of the motor shaft or the propeller shaft driven thereby and another element 16$^f$ of which may comprise a band or brake shoes engaging the wheel. In the preferred form of construction, the band or shoes are normally applied so as to brake the wheel and through the latter brake the truck against movement, such application being effected by a suitable spring or springs 16$^g$. Where both pairs of truck wheels are driven, as illustrated, the brake mechanisms are duplicated so as to act on both motor shafts and the axle mechanisms connected thereto. With the brake mechanism or mechanisms arranged and operating as just described, the pedal 16 will be positioned as shown in Figs. 2 and 13; and if the pedal is pushed downwardly, it will, through the link 16$^a$, lever 16$^b$, and rod 16$^c$, operate to release the brake mechanisms.

17 indicates a switch mechanism preferably mounted on the dash 7. The switch mechanism 17 is inter-related and connected with the brake pedal through the rod 17$^a$ (see Fig. 13) and controller 11 by devices indicated as an entirety at 17$^b$ (see Fig. 13) to open and close the circuit to the motors 2', 3', dependent upon whether or not the foot pedal 16 is operated or the position of the controller lever 12, to avoid accidents and unauthorized operation of the truck.

18 indicates a plate extending across the upper surface of the frame 1 near its driving end and forming a suitable support for a sheet metal casing 19. The casing 19 encloses the batteries, which supply current to the motors 2', 3', and the motors for operating the material holding member, as will be hereinafter set forth.

20 indicates as an entirety a base member or support rigidly connected by suitable means to the frame 1 and preferably arranged near that end of the latter opposite to its operating end. The connecting means preferably comprises a depending ring 21 formed with screw-threaded openings 21$^a$, to receive bolts 22, extending through aligned openings formed in the flanges of the longitudinal and transverse channel bars 1$^b$, 1$^c$, or plate 22' clamped thereagainst. The base member is shaped or fashioned to provide an upstanding, central shaft or spindle 23, and an annular bearing or bearing face 24. The spindle 23 is preferably hollow to permit the extension therethrough of the necessary circuit leads for the operating motors to be later referred to. 25 indicates a gear surrouding the base member. by preference the gear 25 is provided by integrally forming the teeth on the side or periphery of the base member 20. 26 indicates a support or table rotatably mounted on the shaft or spindle 23. The support 26 is provided with a depending collar 26$^a$, which forms a hub to rotatably fit the shaft 23 or a bushing 23$^a$ thereon. The underside of the support 26 is provided with a depending annular rib 27 which constitutes a face to bear upon the face 24. To reduce the friction between the bearing faces 24, 27, they may be formed with aligned annular grooves 24' to receive balls 27'. The free end of the shaft or spindle 23 is provided with screw threads to take one or more nuts 28, which act through a washer 28$^a$ to secure the support 26 on the shaft. 29 indicates a cap enclosing the upper end of the shaft 23 and nuts 28, being secured in position on the support 26 by cap screws 29$^a$. The cap 29 has an opening through its top for the leads already referred to.

Figure 5:
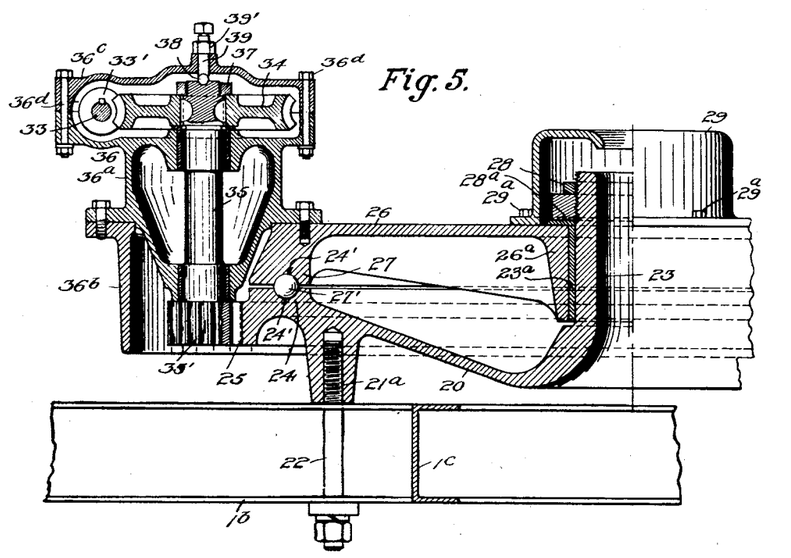
Fig. 5 is a section on the line 5—5 of Fig. 3.

30 indicates as an entirety means for rotating the support 26 about the spindle 23. Of these means, 31 indicates an electric motor, preferably mounted on the support 26, being secured to a base plate 32, which in turn is suitably secured to the upper face of the support. The motor 31 may be arranged on the rearward portion of the support 26 and its shaft is connected in any desired manner to a propeller shaft 33. The shaft 33 is provided with a worm 33' which meshes with a worm gear 34 and the latter is keyed to a shaft 35 carrying a pinion 35' which meshes with the gear 25 to drive it (see Figs. 3 and 5). The shaft 33 is mounted in bearings provided in a casing 36 which comprises separable elements shaped to enclose the shaft 33, worm 33', gear 34, shaft 35 and pinion 35'; one element 36$^a$ of the casing being rigidly secured to the support 26 (as shown in Fig. 5) and supporting a skirt 36$^b$ which protects the pinion 35'. The casing elements 36$^a$, 36$^c$, are connected by suitable bolts 36$^d$. In the preferred form of construction, the pinion 35' and shaft 35 are formed integrally and the upper end of the latter is provided with screw threads to take a nut 37, which removably holds the gear 34 against a shoulder or the flanged end of a bushing forming one bearing for the shaft 35. The free end of the shaft 35 is formed with a recess in which a ball 38 is positioned, the ball being engaged by the end of a pin 39 supported in the wall of the casing element 36$^c$, and forming an anti-friction thrust bearing. The pin 39 preferably comprises a bolt screw-threaded into an opening formed in the casing element 36$^c$, whereby its free or ball-engaging end may be adjusted. The bolt is located in its adjusted position by a nut 39'.

Figure 1:
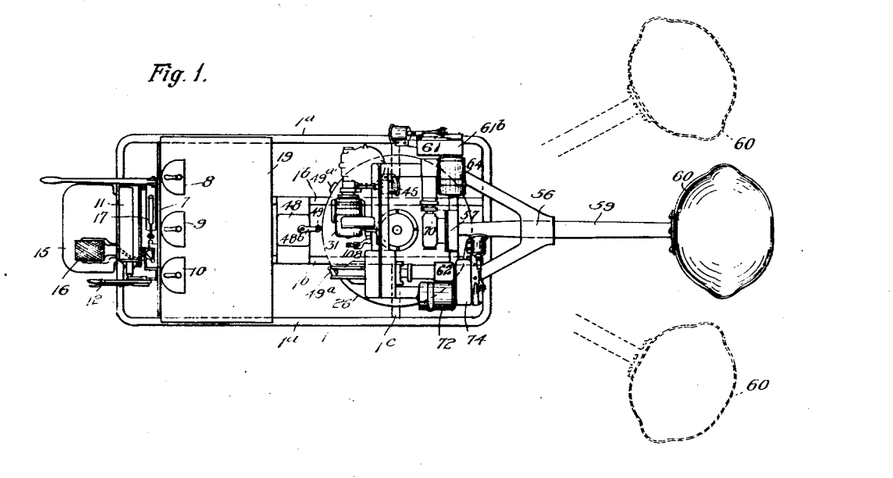
Fig. 1 is a top plan view of a truck embodying my invention.

The motor 31 may be driven in either direction, the electric circuit therefor being established by operation of the controller 8, dependent upon its direction of movement. The controller 8 may be constructed to provide for different speeds of the motor 31. When the motor 31 is driven it will operate through the shaft 33, gearing 33', 34, shaft 35, gearing 35', 25, to rotate the support 26 on the spindle 23 in either direction from the mid-position shown in Figs. 1 and 3. By reversing the motor 31, the support 26 may be moved back to normal position or there beyond.

40 indicates as an entirety means which automatically operate to stop the rotation of the propeller shaft 33 and to hold it against movement when current to the motor 31 is shut off. Of these means, 41 indicates a wheel or pulley fixed to the propeller shaft 33, preferably at a point between the worm 33' and adjacent end of the motor shaft. 42 indicates a pair of brake shoes adapted to engage and disengage the wheel 41. The free ends of the shoes 42 are connected to one arm of a lever, the movement of which controls the engagement and disengagement of the shoes 42. The operating lever is acted upon by a spring (not shown) in such manner that the shoes 42 will normally engage the wheel 41. 43 indicates a rod connected at one end to the other arm of the brake operating lever. The opposite end of the rod 43 is pivotally connected by a rod 43$^a$ to the core 44 of a solenoid which is mounted in a casing 45 rigidly supported on the support 26 by means of bolts 46. The winding for the solenoid is connected in series with the motor 31, so that when the circuit to the latter is established, the winding is energized, and it in turn actuates the solenoid core. The core pulls on the rod 43, which moves the brake operating lever to release the brake shoes 42. Upon the cutting off of current to the motor 31, the solenoid winding is de-energized, which permits the spring to act on the operating lever and apply the brake shoes 42. The brake mechanism 40 operates to stop rotation of the shaft 33, and through it the movement of the support 26, when the circuit for the motor 31 is broken. This mechanism also prevents movement of the support 26 in either direction, except upon its release and operation of the motor 31, as just described.

47 indicates as an entirety means which automatically operate to limit the rotative movement of the support 26 from its normal position in either direction, such means preferably being of the type to automatically shut off the current to the motor 31 when the support 26 reaches a predetermined position in its movement in either direction about the shaft 23. Of these means, 48 indicates a casing enclosing pairs of contacts or switch elements interposed in the motor circuit so that when the motor 31 is operated in either direction, the circuit flows through one of said pairs of contacts. The casing 48 is supported upon the frame 1, preferably by means of a plate 48$^a$ carried by the bars 1$^b$ (see Fig. 3). 48$^b$ indicates a lever pivoted at 48$^c$ on the base element of the casing 48. The inner end of the pivot 48$^c$ extends within the casing and carries an arm which operates a contact of either pair to open the motor circuit, dependent on the direction of movement of the support 26. The outer end of the lever 48$^b$ extends toward the support 26, its free end preferably carrying a roller 49 which is disposed in the path of movement of tappets or cams 49$^a$, 49$^{a'}$, fixed to the side wall of the flange 26$^b$ depending from the periphery of the support 26. The cams 49$^a$, 49$^{a'}$ are preferably disposed equal angular distances to either side of the roller 49, when the support 26 is in its normal position. The support 26 may be rotated in either direction, but if its driving means rotate it far enough to move either cam into engagement with the roller 49 the cam will swing the lever 48$^b$ about its pivot and the lever in turn will operate one of the contacts, thus opening the motor circuit and stopping the motor 31.

The switch mechanism within the casing 48, for opening and closing the circuit to the motor 31 may be of any desired construction, such, for example, as that illustrated in my co-pending application, Serial No. 610,791.

50 indicates a pair of spaced standards suitably bolted to the upper surface of the support 26. The standards 50 are provided with aligned openings which support outwardly extending stud shafts 51, 51. The shafts 51, 51, form trunnions for a frame or rocker, indicated as an entirety at 52 (see Fig. 8). The frame 52 comprises a pair of side members 52$^a$, 52$^a$, having aligned openings 53 to receive the shafts or trunnions 51, 51, and cross members 54, 55. The front or forward portions of the side members 52$^a$, 52$^a$, preferably converge together, being integrally formed with the walls of a bearing 56, which is in alignment with a collar 57 provided in the cross member 54. The collar 57 forms a support for a casing element 58, having a bearing 58ª, to be later referred to. For reasons which will later appear, a plane cutting the axis of the bearings 56, 57, is disposed at right angles to a vertical plane cutting the axis of the trunnions 51 on which the frame 52 rocks. The collar 57 is preferably integrally formed with the cross member 54. The cross member 55 intermediate its ends is shaped to provide opposing sides or faces 53ª, 53ª, in which are formed aligned guides 54ª, the purpose of which will be later set forth.

59 indicates a rod or shaft extending through and rotatably mounted at its inner end in the bearings 56, 58ª, the shaft being disposed substantially horizontally when the rocker or frame 52 is in normal or mid-position (see Figs. 2 and 6); the outer end of the shaft 59 extends beyond the adjacent end of the frame 1 and carries at such outer end a material carrying element or holder 60, preferably a liquid or fluid holder, such as a ladle, capable of being dipped into a fluid, molten metal, molten glass, or other liquids to be handled and then moved into position to hold the material and hold it while the truck is operated to the place of discharge, whereupon the holder may be operated or moved to pour or dump the material into other holders or ladles, or directly into a draw-tube or mold cavities. The material carrying element or holder 60 may be of any desired shape and size and its walls may be variously constructed dependent upon the character and temperature of the liquid to be handled. To effect these operations, I provide means, indicated as an entirety at 61, for rotating the shaft 59 in one or in opposite directions and separate means, indicated as an entirety at 62, for rocking the frame or rocker 52.

Of the rotating means 61, 61ª indicates a casing having a main section 61ᵇ and a tubular section 61ᵇ′. The main section is open at its top, such opening being closed by a cover or plate 61ᶜ. The casing 61ª is rigidly secured, in any desired manner, to a plate 63, which in turn is secured to a seat 63ª provided on one of the side members 52ª. 64 indicates an electric motor rigidly connected to the plate 63, in any desired manner, preferably by a strap 64ª. The shaft of the motor 64 is connected through a suitable reduction gearing, the elements of which are mounted in the walls of the casing 61ª and enclosed therein, to a shaft 65.

The motor 64, motor shaft, reduction gearing, the connection of the latter with the shaft 65, as well as the casing 61 are preferably similar in construction to corresponding elements, which are hereinafter described (see Fig. 10), forming part of the rocker operating means 62.

Figures 6, 7, 8, 9, 14:
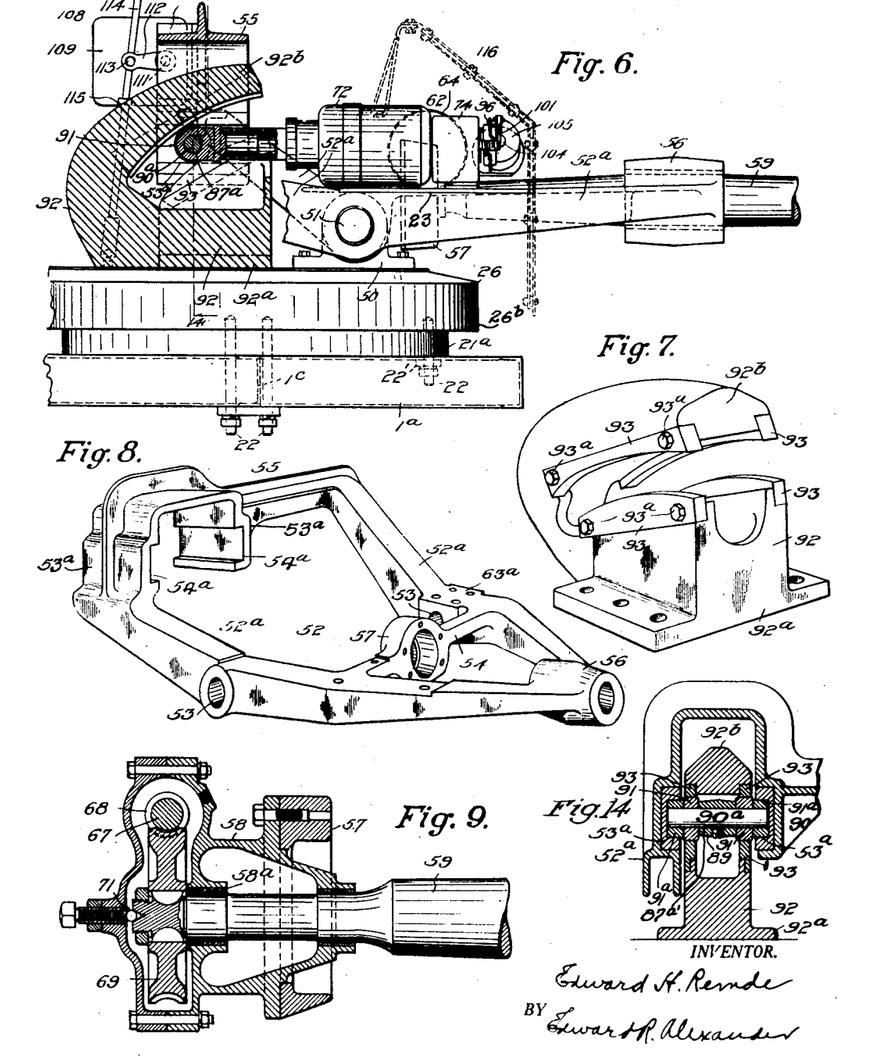
Fig. 6 is a section on the line 6—6 of Fig. 3.
Fig. 7 is a perspective of the cam frame.
Fig. 8 is a perspective view of the carrying frame for the material holding member.
Fig. 9 is a fragmentary section on the line 9—9 of Fig. 3.
Fig. 14 is a section on the line 14—14 of Fig. 6.

The shaft 65 extends through the tubular section 61ᵇ′, being supported at the outer end of the latter by a bearing 66, and is connected by a flexible joint 66ª with a propeller shaft 67. The propeller shaft 67 carries a worm 68, which meshes with a worm gear 69 secured to the inner end of the shaft 59 (see Fig. 9). 70 indicates a casing which cooperates with the casing element 58 to enclose the propeller shaft 67, worm 68, worm gear 69 and inner end of the shaft 59. By preference these elements are respectively similar to like elements enclosing the shaft 33, worm 33′, gear 34 and shaft 35, for which reasons it will not be necessary to describe them. As shown in Fig. 9, the casing is rigidly secured to the collar 57.

71 indicates a thrust bearing disposed between the inner end of the shaft 59 and the adjacent wall of the casing 70 adapted to take thrust in an inward direction. By preference, the thrust bearing 71 is similar in construction to the thrust bearing for the shaft 35, for which reason it will not be necessary to describe it.

Figure 10:
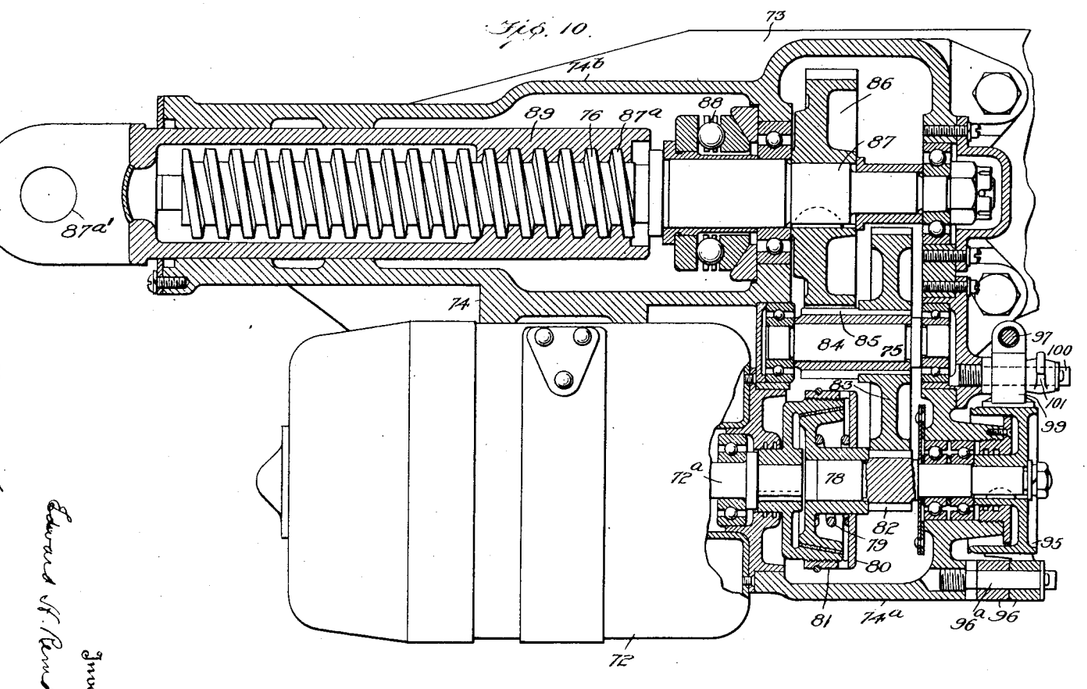
Fig. 10 is a fragmentary view, partly in section of the motor, and mechanism for rocking the holding member carrying frame.

Of the rocking means 62, 72 indicates a motor, preferably of the electric type, secured in any well known manner to a supporting plate 73 or a casing 74 (or both). The casing 74 houses a suitable reduction gearing, indicated as an entirety at 75, and a driven element, such as a screw 76, and may comprise a main section 74ª for the reduction gearing 75 and a tubular section 74ᵇ for the screw 76. The casing is open on its upper side, such opening being closed by a cover 77. 78 indicates a propeller shaft suitably mounted in the walls of the casing section 74ª and suitably connected at its inner end to the shaft 72ª of the motor 72. The propeller shaft 78 preferably comprises two sections each carrying a friction clutch element correlated to effect the drive from one section to the other. One clutch element is fixed to the adjacent shaft section and the other clutch element is splined to the adjacent shaft section and is normally pressed toward the other element by a spring 79, the tension of which determines the friction between the clutch elements so that the power of the motor may be utilized to drive the shaft 78 up to any desired maximum load, dependent upon the friction between the clutch elements, beyond which slippage between these elements will take place and thus prevent damage to the motor 72. The tension of the spring 79 is preferably regulated or controlled by a thrust plate 80 having an opening for the shaft 78 whereby the plate is slidably and rotatably mounted on the latter. The plate 80 is provided with a flange 81 which is provided on its inner wall with screw threads engaging the screw threads on the outer wall of the remote clutch element. As shown in Fig. 10, the spring 79 is interposed between the plate 80 and adjacent clutch element and normally operates to move the latter toward the other clutch element.

By rotating the plate 80 on the shaft 78, it will be moved toward or from the adjacent clutch element and thus increase or decrease the tension of the spring 79, as may be desired.

The reduction gearing 75 preferably comprises a pinion 82 formed integrally with one section of the shaft 78, a gear 83 meshing with the pinion 82 and fixed to a shaft 84, a pinion 85 fixed to the shaft 84 and meshing with a gear 86, which is fixed to a shaft 87 extending substantially centrally into the tubular section 74b. The shafts 78, 84 and 87 are suitably supported in side walls of the casing section 74a, such walls being preferably formed with seats for bearings of a well known character. 88 indicates a thrust bearing for the shaft 87, such bearing being disposed at the inner end of the tubular casing 74b.

The free end of the shaft 87 is provided with threads 87a with which engage the threads 76 (already referred to) of a nut 89. The nut 89 is preferably in the form of a sleeve or tubular member which slidably fits the inner wall of the tubular section, the outer end of the sleeve being connected with a cross-head to be later referred to.

Figure 3:
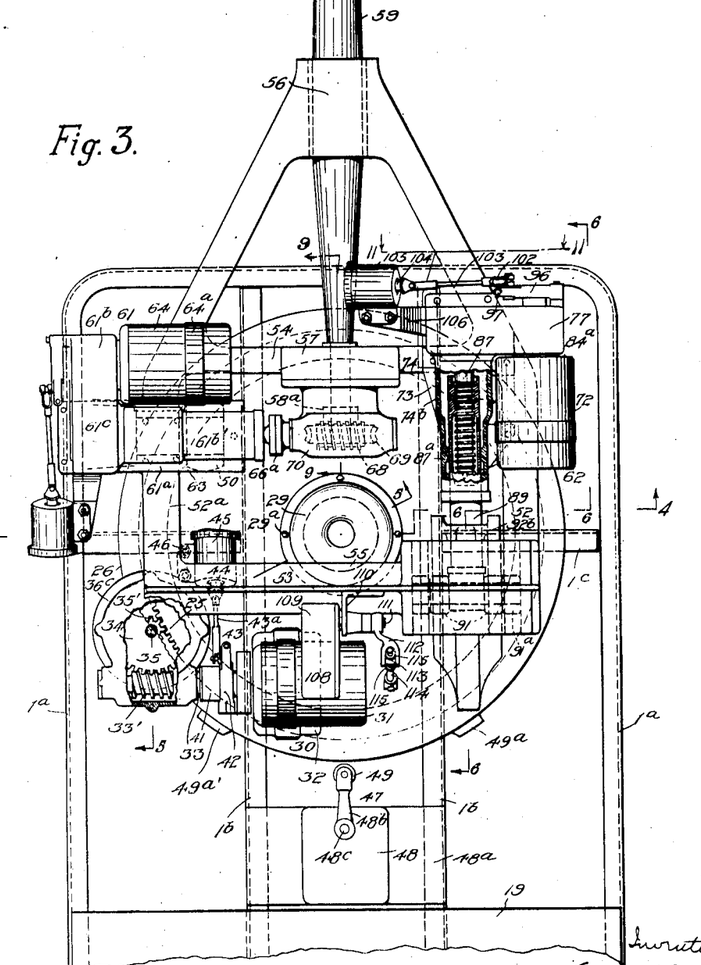
Fig. 3 is a fragmentary plan view of the mechanisms for operating the material holding member.
Figure 4:
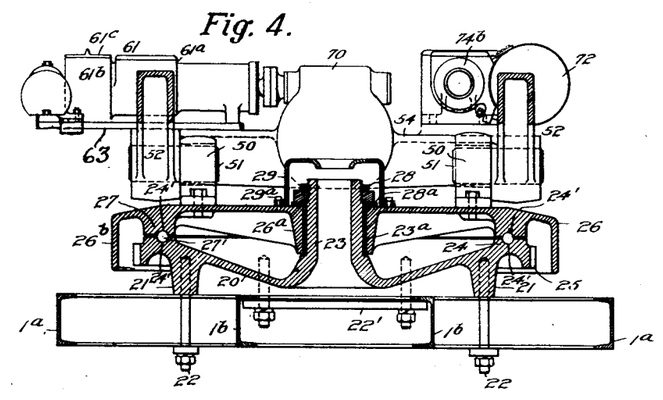
Fig. 4 is a section on the line 4—4 of Fig. 3.

As will be understood from Fig. 3, the nut 89 is moved endwise in one direction or the other, dependent upon the direction of rotation of the shaft 87, being guided by the inner walls of the tubular casing section 74b. The outer end of the nut 89 is connected to a cross head 90 comprising a transverse shaft 90a mounted in an opening 87a' formed in the free end of the nut 89 and carrying at its opposite ends inner and outer pairs of rollers 91, 91a, the outer pair of which (91a) engages with and rolls upon the guides 54a. 92 indicates a casting mounted on the support 26 and shaped to form a base 92a and an arm 92b extending over but in spaced relation to the base 92a. The opposite side edges of the base 92a and arm 92b are grooved to form seats for pairs of hardened steel guides or cams 93, with which the inner pair of rollers 91 engage. The guides 93 may be removably secured in their seats by cap screws 93a. As shown in Fig. 6, the casting 92 is so positioned on the support 26 that when the shaft 59 is in its mid or normal position, that is, in a horizontal plane, the crosshead 90 is disposed substantially midway between the ends of the cams 93. If now the shaft 87 is driven in a direction to give the crosshead 90 a thrust movement outwardly, (that is, toward the left in Fig. 6), the cam or cams 93 will co-act with the guides 54a, to cause the frame or rocker 52 to swing or rock on its trunnions in a counter-clockwise direction; if the shaft 87 is rotated in the opposite direction, the frame 52 will swing or rock in the opposite direction. As the inner end of the shaft 59 is carried by the frame 52, such movement will result in swinging the outer end of the shaft upwardly and downwardly, thereby enabling the operative to move the ladle 60 downwardly (see dotted lines in Fig. 2) into a pot, crucible or other container to dip out a charge of material and then by swinging the ladle 60 upwardly to its horizontal position, the liquid will be held against spilling. In carrying out this operation, the operative may simultaneously rotate the shaft 59 to facilitate the dipping operation and filling of the ladle.

94 indicates as an entirety a brake mechanism for stopping the motor 72 and elements driven thereby after the circuit to the motor has been broken. This mechanism is preferably automatically operated to facilitate the starting and stopping of the rocking frame. Of the brake mechanism 94, 95 indicates a brake wheel preferably fixed to the shaft 78. For this purpose, the shaft 78 is extended outwardly beyond the outer side wall of the casing section 74a. 96 indicates a pair of brake shoes having overlapping ends pivotally mounted on a bolt 96a supported in the casing 74a. The opposite ends of the shoes are extended laterally, their ends being formed with aligned openings to receive a bolt 97 carrying a thumb-nut 97a at its free end. 98 indicates springs disposed between the extended shoe ends and the bolt head and thumb-nut 97a, respectively, and serving normally to operate the shoes 96 against the brake wheel 95. 99 indicates a winged member rotatably mounted on a shaft 100 supported at its inner end by the outer side wall of the casing section 74a (see Fig. 10). The winged member operates, when rocked to engage the extended shoe ends to move them in opposite directions to release the shoes 96 from the wheel 95. The winged member 99 is connected to a lever 101, which is pivotally mounted between bifurcations 102 carried on the outer end of a rod 103. The inner end of the rod 103 is pivotally connected to a core 104 of a solenoid, the winding of which is enclosed in a casing 105. The casing 105 is preferably mounted on and secured to a bracket 106, supported on the plate 73 by cap screws 107—see Fig. 11. The winding of the solenoid is connected in series with the motor 72 so that when the circuit to the motor is completed, the winding is energized, the core 104 is actuated and the latter releases the brake mechanism; upon opening of the circuit to the motor, either by operation of the controller 10, or by operation of the limiting means, indicated as an entirety at 108, the winding will become de-energized and permit the springs 98 to apply the brake shoes 96.

While I have shown in detail and described only the brake mechanism for the motor 72, it will be understood that the brake mechanisms for the motors 64 and 31 are preferably similar in construction and operation, except that in the brake mechanism for the latter motor it is disposed on the propeller shaft between the motor and the worm 33'.

The circuits to the motors 31, 64, and 72 are controlled by the controllers 8, 9 and 10 respectively. This arrangement permits any one of the motors to be operated or any two or all three thereof simultaneously, to effect rapid operation of the material holder 60.

Of the limiting means 108, 109 indicates a casing which houses pairs of contacts through one of which the circuit to the motor 72 is established when the latter is operating in one direction or the other. The casing 109 is mounted on a bracket 110, carried by the cross member 55 (see Fig. 6) and moves therewith. 111 indicates a shaft mounted in one wall of the casing 109. The inner end of the shaft 111 carries an arm adapted, when moved, to effect disengagement of one contact from the other contact of a pair to break the circuit therethrough and thus stop the motor 72. The outer end of the shaft 111 carries a lever 112 having a bifurcated end in which is rotatably mounted, in aligned openings, a guide block 113. The block 113 is formed with a transverse opening in which a rod 114 slides as the lever 112 and casing 109 move with the frame 52. The lower end of the rod 114 is pivoted to the support 26 (see Fig. 6), such arrangement and the rotative mounting of the block 113, permitting the rod to accommodate itself to the path of movement of the lever 112 as the frame 52 swings in either direction. 115 indicates tappets adjustably connected to the rod 114 and positioned thereon so as to engage the lever 112 to swing it, in the event the frame 52 is rocked in either direction far enough, and thereby effect disengagement of one of the pairs of contacts within the casing 109 and opening of the circuit to the motor 72. The mechanism within the casing 109 is preferably similar to that within the casing 48.

My construction of apparatus permits the holder 60 to be moved laterally to either side, also upwardly and downwardly, and also about the axis of its supporting rod or shaft 59. It will be understood that the apparatus is particularly adapted for handling fluids or liquids since the truck can be readily positioned adjacent a container and the holder 60 bodily moved down thereto. By providing means for rotating the holder support about its axis, it will be seen that the holder may first be wholly or in part inverted and then, simultaneously with the downwardly movement of the holder, it may be rotated into normal position, such operation serving to dip or scoop up a charge of material from the container. By mounting the holder on a power driven truck and providing mechanisms for operating it in the manner set forth, fluids and liquids can be rapidly handled. Where the material is in a molten state, my apparatus permits the conveying of the material to the place of discharge quickly before any substantial lowering of temperature of the material takes place.

Where the apparatus is to be used for handling material which is in a heated condition, such as molten glass, or molten metal, I prefer to provide the support or table 26 with a guard, indicated as an entirety at 116 (shown in dotted lines) to protect the operative from the heat of such material.

To those skilled in the art to which my invention relates, many alterations and changes in construction and widely differing embodiments and applications of the invention will suggest themselves without departing from the spirit and scope thereof. My disclosures and the description herein are purely illustrative and are not intended to be in any sense limiting.

What I claim is:—

1. In apparatus of the class described, the combination of a frame mounted on wheels, a rocker trunnioned on said frame, a shaft rotatably supported at its inner end on said rocker, a material holder supported by said shaft at its outer end, means for rotating said shaft, and mechanism for moving said rocker on its trunnions, said moving mechanism comprising a cam and thrust means carried by said frame and rocker and co-acting to effect movement of the latter in either direction.

2. In apparatus of the class described, the combination of a frame mounted on wheels, a rocker trunnioned on said frame, a shaft rotatably supported at its inner end on said rocker, a material holder supported by said shaft at its outer end, a cam carried by said frame, and operating means carried by said rocker, said operating means including a screw and nut, one of said elements acting as a thrust device to engage said cam and effect movement of said rocker.

3. In apparatus of the class described, the combination of a frame mounted on wheels, a material carrying element, a member normally disposed substantially horizontally and extending beyond said frame and carrying said element at its outer end, the inner end of said member being mounted to swing on said frame about vertical and horizontal axes, separate means for swinging said member vertically and horizontally, devices for holding either of said means against movement when its power is cut off, and means for limiting the movement of said member when operated in either of said directions.

4. In apparatus of the class described, the combination of a frame mounted on wheels, a material carrying element, a member normally disposed substantially horizontally and extending beyond said frame and carrying said element at its outer end, the inner end of said member being mounted to swing on said frame on vertical and horizontal axes, means for swinging said member vertically and horizontally, and means for limiting the movement of said member when operated in either of said directions.

5. In apparatus of the class described, the combination of a frame, a turn-table rotatably mounted thereon, a motor and driving connections, elements of which are carried by said frame and turn-table and co-act to rotate the latter, a rocker trunnioned on said turn-table, mechanism carried by said turn-table and rocker arranged to co-act to rock the latter, said mechanism including a power means mounted on said rocker, a member rotatably supported at one end on said rocker, a material handling element carried by said member, and means on said rocker for rotating said member.

6. In apparatus of the class described, the combination of a frame, a turn-table rotatably mounted thereon, a motor and driving connections, elements of which are carried by said frame and turn-table and co-act to rotate the latter, a rocker trunnioned on said turn-table, a guide and a cam, one carried by said rocker and the other by said turn-table, a movable element engaging said guide and cam to rock said rocker, means for moving said element, a member rotatably supported at one end on said rocker, a material handling device carried by the outer end of said member, and means for rotating said member.

7. In apparatus of the class described, the combination of a frame, a turn-table rotatably mounted thereon, a motor and driving connections, elements of which are carried by said frame and turn-table and co-act to rotate the latter, a rocker trunnioned on said turn-table, a guide and a cam, one carried by said rocker and the other by said turn-table, a movable element engaging said guide and cam to rock said rocker, means carried by said rocker for moving said element, a member rotatably supported at one end on said rocker, a material handling device carried by the outer end of said member, and means for rotating said member.

8. In apparatus of the class described, the combination of a wheel mounted frame, a support rotatably mounted thereon, means for rotating said support, a rocker trunnioned on said support, a shaft rotatably supported on said rocker and extending outwardly therefrom, a material handling member on the outer end of said shaft, co-acting elements between said support and rocker for operating the latter, an electric motor on said rocker for operating the co-acting element carried thereby, an electric motor on said rocker for rotating said shaft, and means associated with each motor and controlled automatically by the current supplied thereto for braking and releasing it for operation.

9. In apparatus of the class described, the combination of a frame, supporting wheels therefor, a rocker trunnioned on said frame, a shaft rotatably supported at its inner end on said rocker, a material handling member supported on the outer portion of said shaft, means for rotating said shaft, and mechanism for moving said rocker on its trunnions in either direction, said moving means comprising a thrust means on said rocker movable in a plane substantially parallel thereto and a co-acting device on said frame.

In testimony whereof I affix my signature.

EDWARD H. REMDE.